March 25, 1958 D. C. BLISS 2,828,364

AUTOMATIC TELEPHONE SYSTEM

Filed July 7, 1954 6 Sheets-Sheet 1

INVENTOR
Donald C. Bliss
BY
Pennie, Edmonds, Morton, Barrows & Taylor
ATTORNEYS

March 25, 1958 D. C. BLISS 2,828,364

AUTOMATIC TELEPHONE SYSTEM

Filed July 7, 1954 6 Sheets-Sheet 2

INVENTOR
Donald C. Bliss
BY
Pennie Edmonds, Morton, Barrows & Taylor
ATTORNEYS

March 25, 1958 D. C. BLISS 2,828,364

AUTOMATIC TELEPHONE SYSTEM

Filed July 7, 1954 6 Sheets-Sheet 3

INVENTOR
Donald C. Bliss
BY
Rennie, Edmonds, Morton, Barrows & Taylor
ATTORNEYS

INVENTOR
Donald C. Bliss
BY
Pennie, Edmonds, Morton, Barrows & Taylor
ATTORNEYS

March 25, 1958 D. C. BLISS 2,828,364

AUTOMATIC TELEPHONE SYSTEM

Filed July 7, 1954 6 Sheets-Sheet 5

INVENTOR
Donald C. Bliss
BY
Pennie, Edmonds, Morton, Barrows and Taylor
ATTORNEYS INVENTOR
Donald C. Bliss
BY
Pennie, Edmonds, Morton, Barrows & Taylor
ATTORNEYS United States Patent Office 2,828,364

Patented Mar. 25, 1958

2,828,364

AUTOMATIC TELEPHONE SYSTEM

Donald C. Bliss, Sussex, N. J.

Application July 7, 1954, Serial No. 441,890

10 Claims. (Cl. 179—18)

This invention relates to an improved fully automatic private exchange dial-telephone system and method of operation in which selective ringing and intercommunicating is attained without the use of line relays.

In accordance with the invention polarized line circuits and polarized ringing circuits are provided thereby eliminating the need for costly line relay equipment. As a result, the cost of automatic private exchange dial-telephone apparatus is very materially reduced and both installation and maintenance thereof become relatively simple and inexpensive.

With the elimination of line relay equipment, the exchange enclosure unit or cabinet may be made small, light in weight, and readily hand-portable and may be placed at any convenient location such as on a closet shelf, even in a desk drawer for a ten-line unit.

Additionally, the improved system draws no current from its voltage supply sources until a receiver-transmitter is lifted at a telephone, thus conserving electric power with attendant savings during non-operating periods.

While the invention is useful in an automatic private exchange dial-telephone system having any desired number of dial telephones, its embodiment in a system having a limited number is particularly advantageous and it will be described with reference to the accompanying drawings showing a ten-line unit adapted to be operated with rectified voltages from an alternating-current source, in which.

Figure 1:
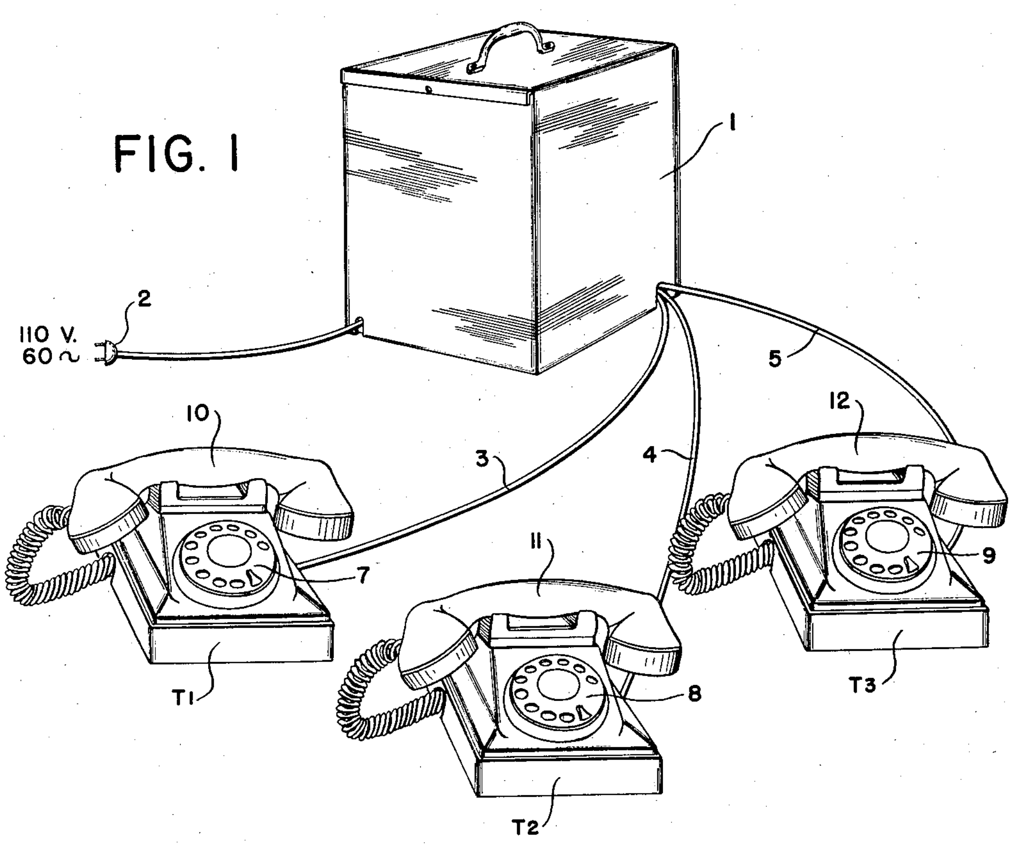
Fig. 1 shows a compact ten-line automatic exchange unit adapted to be connected to an alternating-current voltage source, all in accordance with the invention, with three telephones, to scale, illustrating the relative size of the unit as compared to a standard desk-type dial telephone.
Figure 3:
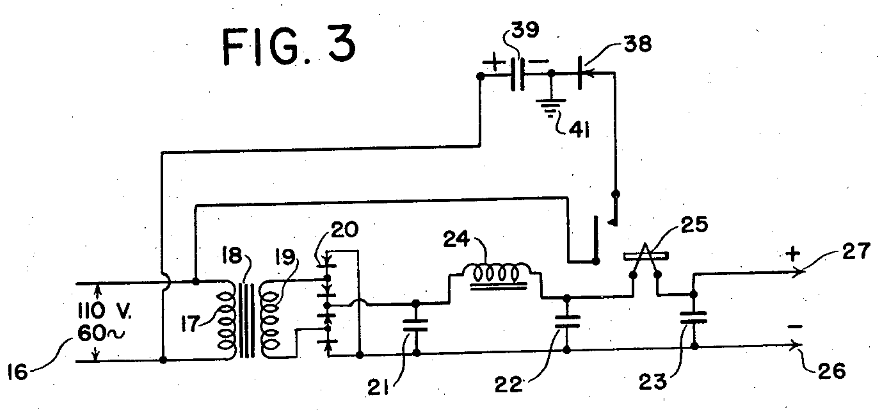
Fig. 3 is a schematic detail circuit diagram of the rectifier arrangements for supplying the relatively low-voltage direct current for the common supply circuit, and the relatively high-voltage current for the operating circuits.

Referring now to Fig. 1, the compact unit 1 provides a fully automatic dial-telephone exchange for a ten-line circuit signalling and intercommunicating system in accordance with the invention. The cabinet or enclosure unit 1 contains all of the necessary operating components of the improved system including the line-finder and selector switches, relays, power rectifier arrangements and half-wave rectifiers, etc., shown in circuit relation in Fig. 2. The unit 1 is shown as adapted to be connected by a plug 2, to a source of 110-volt 60-cycle alternating current, for power.

The three dial telephones T1, T2 and T3 are each connected by a single pair of conductors 3, 4 and 5, respectively, to the unit 1. In this way line circuits are provided for each of the telephones T1, T2 and T3 between unit 1 and the telephones.

Figure 2:
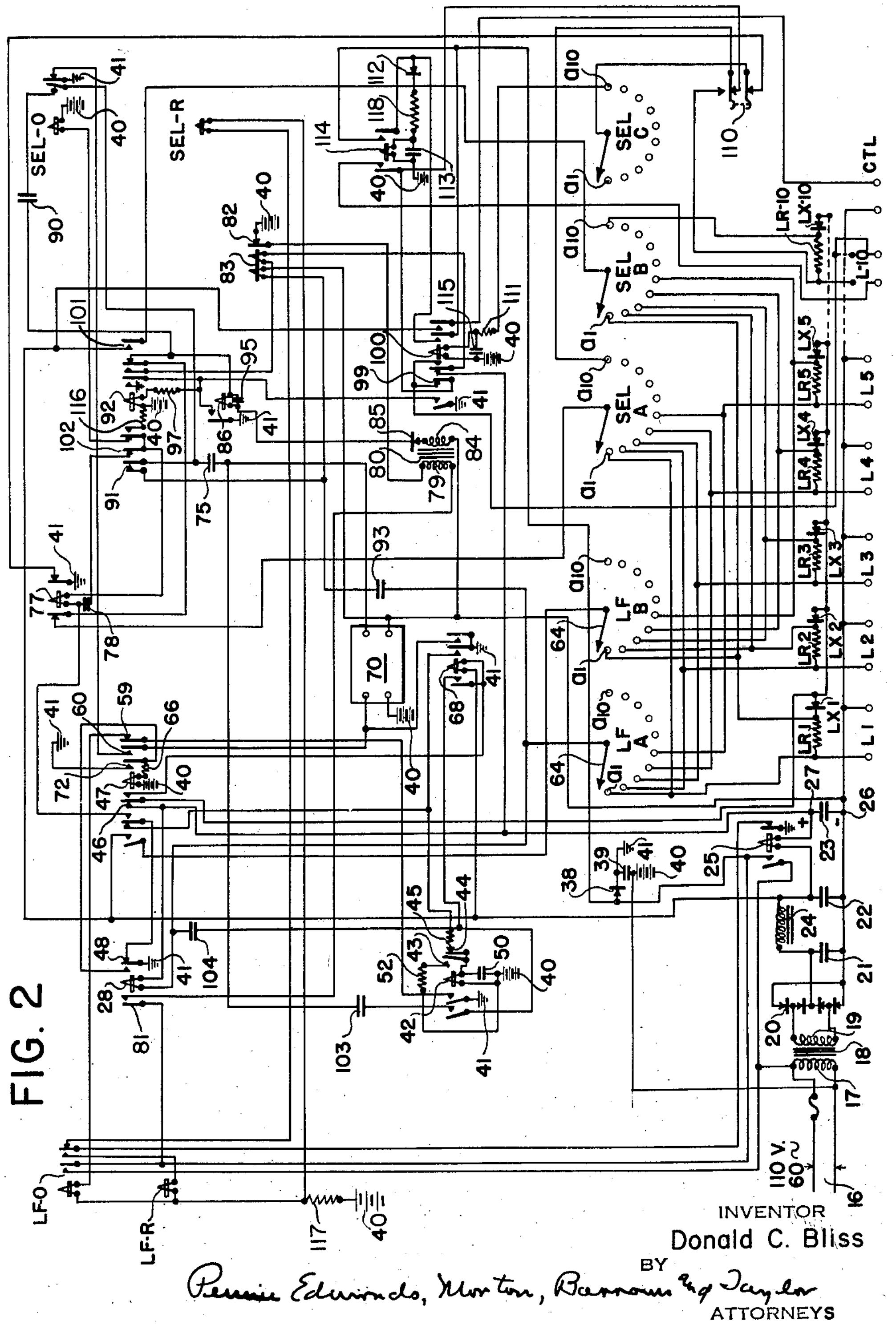
Fig. 2 is a complete circuit diagram showing the various components and electrical connections of a ten-line automatic dial-telephone exchange, in accordance with the invention.

The small dimensions of the unit 1 are apparent, since the dial telephones and the unit 1 are drawn to scale. The dimensions of unit 1 are 9" x 8" x 8". Each of the telephones T1, T2 and T3 are of the standard desk dial type and the dial devices 7, 8 and 9, respectively, serve upon manipulation in the usual way to call any other telephone of the system. Only three telephones are shown connected to the unit 1 in Fig. 1, but unit 1 provides a ten-line automatic exchange and is capable of serving ten dial telephones as indicated in Fig. 2.

Each of the dial telephones T1, T2 and T3, and any others (up to ten) connected to the unit 1 may originate calls to any other telephone upon first lifting the receiver-transmitter, for example, one of the receiver-transmitters 10, 11, 12, respectively, at the telephones T1, T2 and T3, and operating the dial device thereat, for example, one of the dials 7, 8, 9.

The circuits and operation of the improved system of my invention will now be described by reference to Fig. 2, additional reference being made to the detail circuit diagrams of Figs. 3 to 9, inclusive, as may be required for a complete understanding. Identical reference numerals and letters in the several drawings indicate the same components and circuit arrangements.

As explained above, the circuit diagram of Fig. 2 illustrates the components and circuit connections contained within the cabinet enclosure or unit 1. Each one of the line circuits L1 to L10, inclusive, include a single pair of copper conductors 3, 4 and 5, for example, and telephones T1, T2 and T3, inclusive, referred to in connection with Fig. 1, as well as corresponding telephones and conductor pairs for line circuits L4 to L10, inclusive.

The 110-volt 60-cycle alternating-current power source 16 is connected to the primary 17 of transformer 18, the secondary 19 of which is connected to a bridge-type selenium rectifier 20, which in turn is connected to the filtering condensers 21, 22 and 23, and the inductance 24. A winding of relay 25 also serves as a filter reactor. The circuit comprising the condensers 21, 22, 23 and reactors 24, 25, provide filtering for the rectified alternating current and provide a 24-volt direct current for talking in the line circuits L1 to L10, inclusive, and for controlling the operating voltages of the unit 1.

The relay 25 functions only when direct-current power is drawn from the 24-volt circuit upon the lifting of a receiver-transmitter at a dial telephone. Relay 25 operates slowly because of the time constants required to charge and discharge the filter condensers and therefore does not respond to dialing or other impulses of short duration in the load circuits. In addition to serving as a filter reactor the relay 25 functions to switch and connect the voltages for operating other switches and relays in the system and also to supply the voltages for ringing current and for tone voltages.

Figure 4:
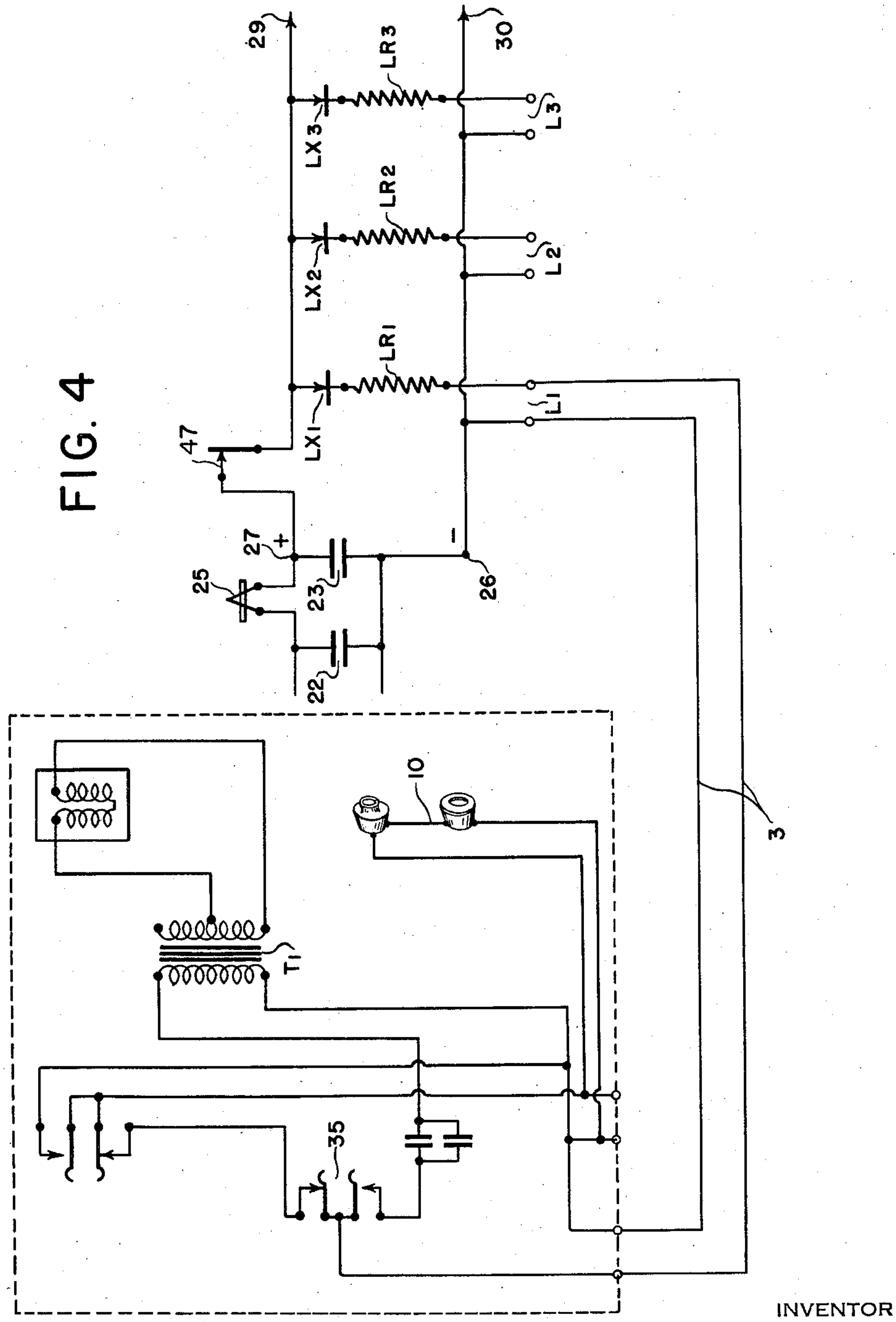
Fig. 4 is a schematic detail circuit diagram of the common low-voltage supply circuit connected to each of the several single pair conductors of the line circuits, and shows the half-wave rectifiers connected in each of the several line circuits, one line circuit being shown complete with its dial telephone.

The negative side 26 of the 24-volt direct-current supply voltage is common to all ten-line circuits L1 to L10, inclusive. The positive side 27 of this supply is connected through the left inner normally closed contacts of relay 47 to a common supply circuit 29, 30, connected to the half-wave rectifiers LX1 to LX10 of all line circuits L1 to L10 as shown in Fig. 4. The line circuits L1 to L10 are therefore connected across the common supply circuit 29, 30 in parallel.

In Fig. 4 it will be noted that each line circuit contains a resistor, LR1 to LR10, inclusive, respectively, and a half-wave rectifier LX1 to LX10, inclusive, respectively. Current will flow in only one direction in the line circuits L1 to L10, inclusive, due to the fact that current is permitted to flow in one direction only by the poled half-wave rectifiers LX1 to LX10. This arrangement when used in ringing as described in connection with Fig. 6 permits full selectivity for ringing and intercommunicating without the use of line relay equipment.

In Fig. 4 when dial telephone T1 originates a call by lifting the receiver-transmitter 10 from the microswitch 35, there is effectively introduced across the line circuit L1, the resistance LR1. The half-wave rectifier LX1 is so poled and connected that current from the 24-volt direct-current supply 26, 27, will flow through LX1 and LR1 in one direction only. Since start relay 25 is in this circuit, it remains operated during the use of the line circuit L1. The start relay 25, in operating, connects the 110-volt 60-cycle alternating-current line to the half-wave rectifier 38 and condenser 39. The resultant rectified voltage is applied to the common-voltage and return connections of Fig. 2. Connections to this voltage are identified in Fig. 2 with conventional battery and ground symbols 40, 41.

Immediately upon application of the rectified voltage to the common-voltage and return connections relay 42 operates through its outer right normally closed contacts 44, through resistor 45, left middle normally closed contacts of relay 47 to return (ground) 41 on the right-hand normally closed contacts 48 of the relay 28.

The timing control components resistance 45, and condenser 50, cause the relay 42 to operate slowly as the condenser 50 charges to the point where relay 42 becomes operative.

As relay 42 operates, its own right outer contacts 44 open, thus breaking the operating circuit path to relay 42, and normally open right inner contacts 43 close thus placing a resistance 52 across the condenser 50. The condenser 50 discharges through the relay winding and through resistance 52 until the reduction of voltage causes the relay 42 to release, removing the shorting resistor 52 and restoring the operating path. The relay 42 thus operates and releases as long as the circuit from the relays 28 and 47 is closed. At each operation of the relay 42 a pulse voltage is applied to the line-finder operating magnet LFO from the left inner normally open contacts of relay 42 through the right outer normally closed contacts 59 of the relay 47 causing the operating magnet LFO to take one step with each voltage pulse produced by the relay 42.

Each terminal (*a*1–*a*10) of the line-finder switch LFA is connected directly to the positive terminal of the corresponding numbered line circuit. The line-finder LFA steps progressively until its contact arrives on the terminal (*a*1) connecting to the calling station, which in this instance is the telephone T1 and its line circuit L1. Because of the potential drop across resistor LR1 caused by current flow from the common supply circuit current flows from the negative line terminal through the line-finder brush 64, the winding of stop relay 28, to the positive (27) side of the 24-volt direct-current supply. Relay 28 operates, closing its right hand contacts 48, in turn operating relay 47 through resistance 66 and the winding of relay 47. Relay 47 connects to ground 41 on its right inner contact 72 and will remain operated as long as a calling dial telephone is in use, and the relay 25 is operated. Operation of stop relay 28 and relay 47 have opened the operating circuit for the pulsing relay 42, thus stopping the line-finder switch LFA on the position connecting to the calling station, in this case *a*–1. The right outer contacts 59 of the relay 47 opens the operating path for line-finder operation magnet LFO, thus preventing subsequent stepping of the line-finder switch LFA.

Figure 5:
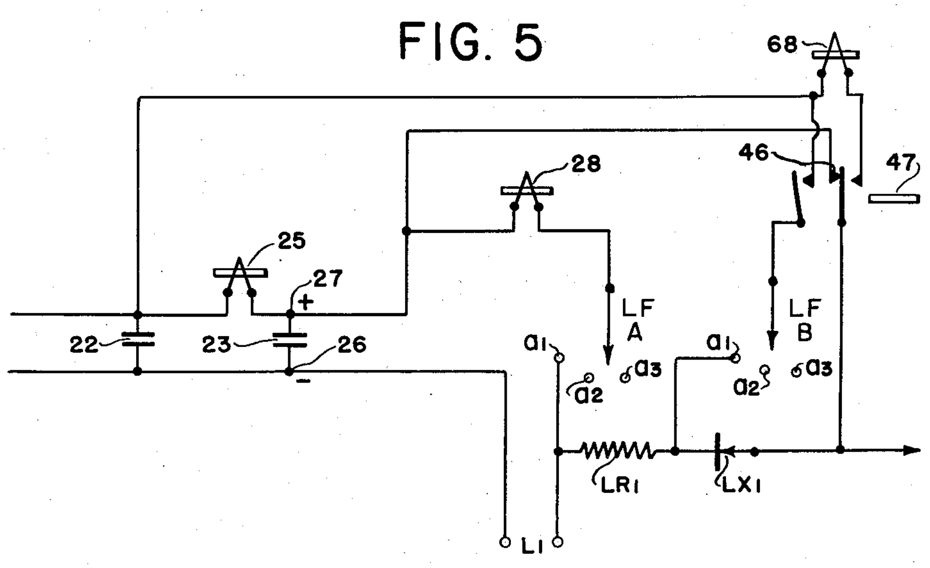
Fig. 5 is a schematic detail circuit diagram showing the arrangement and connection of certain relays of Fig. 2, for "busy" and common line transfer purposes.

As will be observed from Fig. 5 with the relay 47 operated the common connection from the half-wave rectifier (LX1) is transferred by means of the left inner contacts 46 of the relay 47 to the winding of the relay 68. Relay 68 would immediately operate to the line circuit were it not from a circuit of the left outer make contacts of the relay 47 which connects the 24-volt direct-current positive voltage to the junction of the line circuit resistance LR1 and the half-wave rectifier LX1. In this way the flow of any current is effectively prevented from the calling line through the relay 68. Should any other dial telephone attempt to originate a call after the relay 47 has operated, current will flow through the relay 68, operating same. Thus relay 68 is a busy signalling relay. Its associated circuits will be described hereinafter.

The line-finder switch LFO having found the calling line circuit, the system sends back a tone to the calling station (T1) (see Fig. 1) which is heard in its receiver 10 advising that the calling circuit is now ready to accept dialing by manipulation of the dial device 7. Voltages are applied to the tone generator 70 through the circuit including the outer normally closed contacts of the selector SEL–O from ground, through the right center make contacts 60 of the relay 47. The tone generator 70 may be an electronic oscillator which generates an alternating-current voltage at a frequency of approximately 400 cycles. The tone is applied to the negative side of the line circuits L1 to L10 and to the calling line by way of condenser 75, the line-finder contact brush 64, to the calling line circuit.

Dial pulses which consist of momentary opening of the calling line circuit L1 cause the relay 28 to pulse with each digit signalled by the dialing device. Each time the relay 28 releases the selector switch SEL–O steps one step for each digit dialed.

During dialing the relay 77 remains operated due to the voltage retained in condenser 78 which is connected across the winding of the relay 77 by way of the left center normally closed contacts of the relay 92. At termination of dialing, the relay 77 releases connecting the ringing voltage to the called station.

Figure 6:
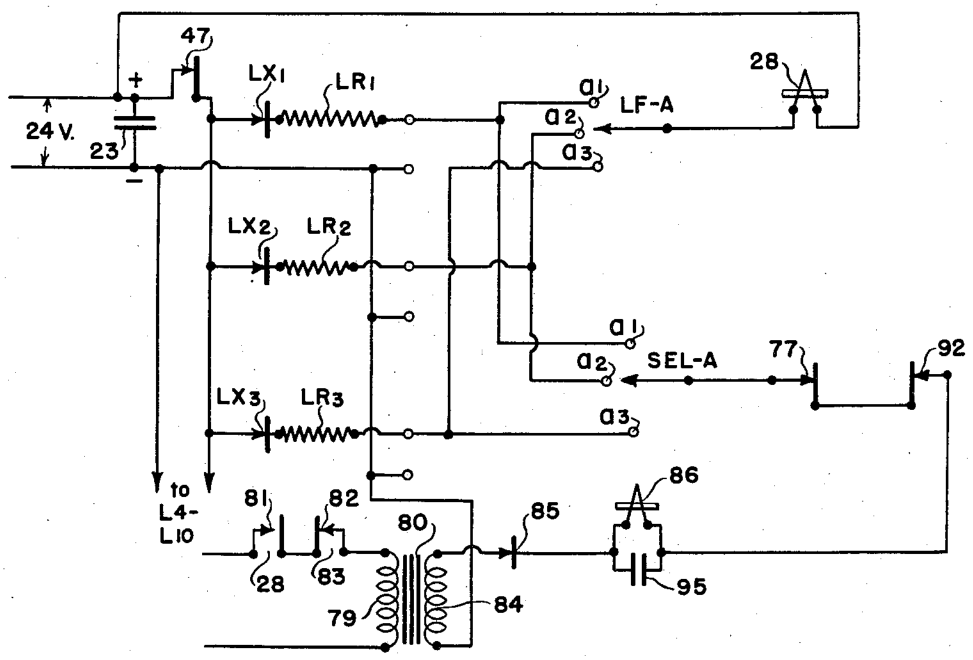
Fig. 6 is a schematic detail circuit diagram showing the connections in Fig. 2, for "ringing"

Fig. 6 shows the ringing circuit wherein ringing is generated by applying the alternating current of the 60-cycle source to the primary 79 of the transformer 80 by way of the left make contacts 81 of relay 28 and the normally closed contacts 82 of relay 83. One side of the secondary 84 of transformer 80 is connected to the common negative side 26 of all of the line circuits L1 to L10, inclusive. The upper terminal of the secondary 84 of transformer 80 connects to the called line through rectifier 85, winding of relay 86 to the brush of the selector switch SEL and the called line.

In Fig. 6 the half-wave rectifier 85 permits only the positive half of the alternating-current voltage output of the transformer 80 to be applied to the called line. Since each line (L1–L10) contains a resistor LR and a half-wave rectifier LX and the half-wave rectifiers are connected between the ringing voltage and the common supply circuit and poled so as to prevent the passage of positive ringing pulses to the common supply circuit, no ringing pulses are impressed upon line circuits other than the called line.

A small amount of the ringing voltage is fed to the calling telephone line circuit L1 through condenser 90, the right inner contacts of the selector switch SEL–O, the left outer normally closed contacts 91 of the relay 92, condenser 93 to the line-finder brush (LF–A) and the called station indicating to the caller that ringing is taking place at the called telephone.

The direct-current ringing pulses are impressed upon and operate a magnetic type of signal indicator at the called telephone which indicating device is connected to the called line through a condenser as shown in Fig. 4. The alternate charge and discharge of this condenser causes the signal indicating device to function while preventing the passage of direct current.

When a receiver is lifted from a switch at a called dial-telephone station, a resistive circuit is completed from the negative to the positive side (26—27) of the called line. Direct-current pulses from the ringing voltage supplied by transformer 80 and rectifier 85, cause the condenser 95 which is connected across the winding of the relay 86, to be charged, thus operating the relay 86. Upon operating, relay 86 causes the operation of relay 92 from ground 41 on the contacts of relay 86 through resistance 97 and the winding of relay 92. The relay 92 then operates and locks to ground 41 on the right inner contacts of relay 92 and in so operating opens the ringing circuit by its right center contacts. The called line is thus connected to the winding of the relay 83 and thence to the 24-volt direct-current positive side of the common-voltage supply 27, 26, through the left inner contacts 99 of the relay 100. The relay 83 operates over the called line circuit and in operating opens the circuit of the primary 79 of the ringing supply voltage transformer 80.

Figure 8:
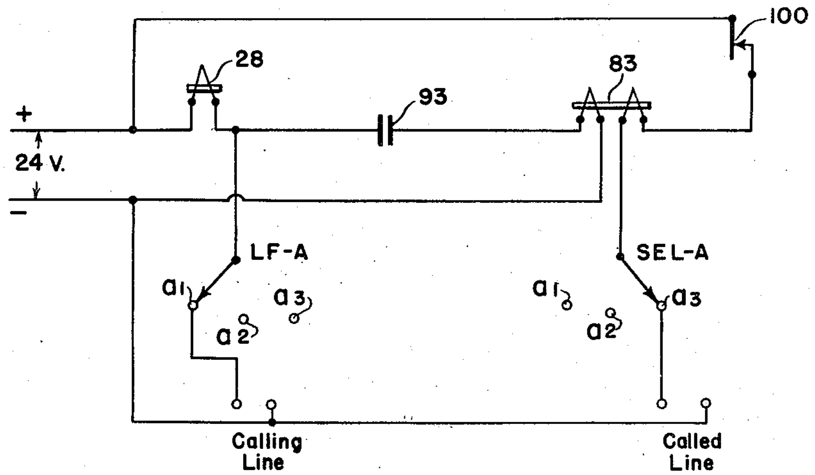
Fig. 8 is a schematic detail circuit diagram showing the connections for a talking circuit between a calling line and a called line in the system of Fig. 2.

The relay 92 in operating opens its left outer contacts 91 removing the ringing and dial tone circuits from the talking circuit or loop, such a talking circuit or loop being shown in Fig. 8.

The left middle contacts 102 of relay 92 in breaking remove condenser 78 from the winding of relay 77. The left inner contacts of relay 92 open the circuit to the selector magnet SEL–O preventing the selector switch SEL from stepping off the called line should the dial at the calling telephone be operated or the receiver switch be manipulated during conversation.

Figure 7:
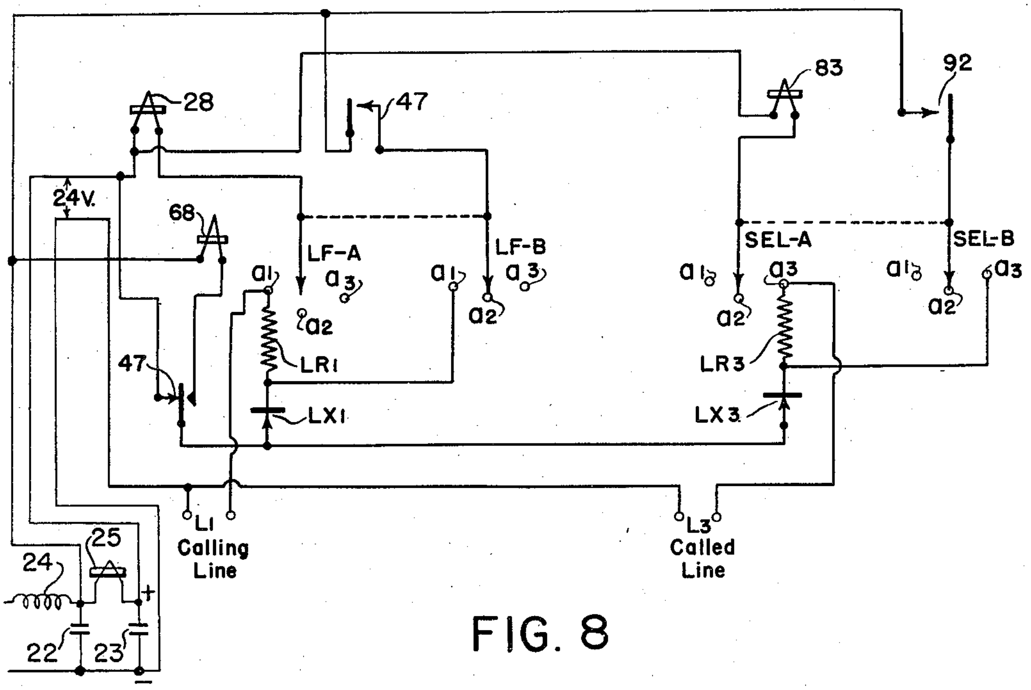
Fig. 7 is a schematic detail circuit diagram showing the connections of the polarized ringing circuit in Fig. 2, and its effect on a called line.

When the relay 83 is connected to the called line, the relay 68 would immediately operate if it were not for the closure of the right outer contacts 101 of the relay 92, which serve to connect the 24-volt direct-current positive potential to the junction of the half-wave rectifier LX and its associated resistance LR, on the called line, in a manner similar to that which was effected by the relay 47 in the case of the calling line, as will be understood by reference to Fig. 7.

With the positive side of the 24-volt direct-current supply connected directly to the half-wave rectifier LX, negative voltage is prevented from flowing to the relay 68, the half-wave rectifiers LX being so poled as to prevent the flow of the positive potential of the 24-volt direct-current common-voltage supply through this circuit. Should any other telephone than those at two stations, for example, those shown in Fig. 7, connected in the lines L1 and L3, originate a call, the negative potential of the 24-volt direct-current common-voltage supply over the line circuit will traverse the half-wave rectifier LX in that circuit and cause the relay 68 to operate. Operation of the relay 68 causes the relay 42 to pulse from ground 41 on the right inner contacts of the relay 68. The right outer contacts of the relay 68 serve to operate the tone generator. The left-hand contact of the relay 68 connects the line side of the relay 68 to the left-hand outer contacts of the relay 42, condenser 103, and the output of the tone generator 70. The pulsing relay 42 causes an intermittent tone to be transmitted to the third telephone which may be involved, indicating that a talking circuit is in use. A tone of low intensity is also transmitted to the two telephones using the talking circuit or loop through a small condenser 104 which connects the calling line directly to the intermittent tone circuit. The two telephones using the talking circuit or loop are thereby made aware that a third telephone desires to utilize the exchange system and thus the users may curtail their conversation to permit the third party to call. Under these conditions, the third party may maintain his receiver-transmitter off the switch until the exchange system is free, whereupon a dial tone will be transmitted to the third party receiver as explained hereinabove. The relayed busy tone signal as just described will not interfere with a conversation between two telephones connected in the talking circuit or loop.

A talking circuit or loop is shown in Fig. 8. The relay 28 connects the 24-volt direct-current supply line voltage to the calling line and one winding of relay 83 serves to connect the talking voltage to the called line. Thus the windings of both relays 28 and 83 serve as talking coils. Relay 28 is coupled to the second winding of relay 83 through condenser 93 and the coupling between the two windings of relay 83 provide the talking loop between the calling line and the called line telephones.

Upon termination of a conversation over the talking circuit or loop as shown in Fig. 8, both telephones are disconnected by replacement of the receiver-transmitters, respectively, on the switches at the telephones. Thereupon, current is no longer drawn from or supplied by the 24-volt direct-current supply and the relay 25 releases. By the connection of ground 41, through the right-hand normally closed contacts of the relay 25, the right-hand make contacts of line-finder relay LF–O causes the operation of the line-finder switch reset magnet LFR.

Common-voltage and return or ground connections is maintained by the inner closed contacts of line-finder relay LF–O, which contacts are effectively in parallel with the left-hand contacts of relay 25 until the line-finder LF is reset. After such resetting, the ground 41 from the relay 25 is transferred by way of the right normally closed contacts of relay LF–O to the selector reset magnet SEL–R. The voltages stored in condensers 21, 22 and 23, caused the selector SEL to reset. The circuit through selector reset magnet SEL–R rapidly reduces the voltage in the common-voltage and ground return circuits to zero. The relays 47 and 92 which have been locked up to this common-voltage supply are released. Thereupon the starting circuit through the left inner normally closed contacts of relay 47 is restored to the line circuits (L1–L10) making the system available for further use.

Figure 9:
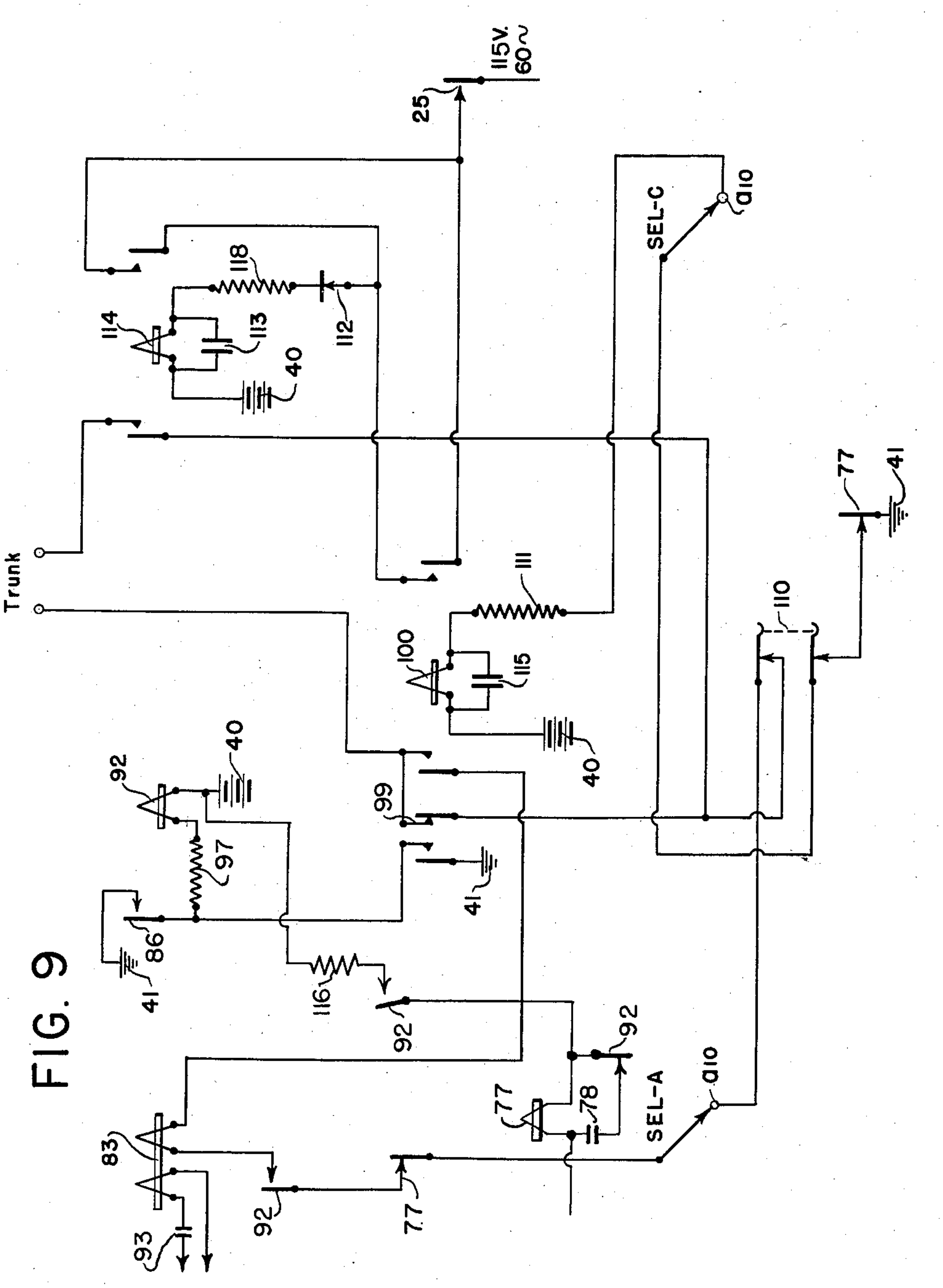
Fig. 9 is a schematic detail circuit diagram showing the connections in the system of Fig. 2, for a talking circuit to an outside trunk exchange, or to a remote device, for example, a recorder or a loud speaker.

Referring now to Fig. 9, associated with line L10, there is provided a toggle switch 110 which when thrown converts the line circuit L10 from a local line to a trunk circuit adapted to be connected with an outside exchange, or for connecting the line circuit L10 to a remote amplifier or other device.

In connecting the line circuit L10 to an outside line, the operation is as follows:

The person at the dial telephone originating the call after receiving the dial tone, dials zero (10). Upon conclusion of dialing, the relay 77 releases and places ground 41 from its right-hand contacts through the lower section of switch 110 on the brush C of the line selector SEL. The brush C of selector SEL now on terminal point *a*10 connects the relay 100 through resistor 111. Thereupon relay 100 operates and places ground 41 from its left outer contacts on winding of relay 92. Relay 92 operates and locks, disconnecting ringing and connecting through one side of relay 83 to the left inner make contact of relay 100, and thence to one side of the trunk terminals as indicated in Fig. 9.

The right inner contacts of relay 100 connects the 115 volts of the 60-cycle alternating-current supply to a rectifier 112, which in turn causes direct-current voltage of the common-voltage and return connections to be applied to a condenser 113 across the winding of relay 114. Thereupon the relay 114 operates and locks on its right-hand contacts. The left-hand contacts of relay 114 connect the other side of the trunk circuit as shown in Fig. 9 through the upper contacts of the switch 110, terminal *a*10 and brush A of selector switch SEL, the normal contacts of relay 77, middle right make contacts of relay 92, to the other side of the winding of relay 83. The dial tone from the outside exchange is transmitted to the calling dial telephone through the windings of relay 83 and the condenser 93.

It is to be noted that relay 92 in operating removes the condenser 78 from across the winding of relay 77. Relay 92 also transfers the circuit of relay 77 from the selector switch magnet SEL–O to common-voltage supply through a resistor 116.

When the desired number of the outside exchange is dialed, relay 77 operates and releases with each pulse, thereby opening the trunk line as shown in Fig. 9 at each operation. The dial pulses are thereby repeated to the trunk line causing selection to take place in the outside exchange. During dialing, ground 41 from relay 77 is removed from the circuit of relay 100 at each pulsation of the relay 77. The relay 100 does not release, however, because of the voltage stored in the condenser 115 across its winding.

If during a conversation with an outside party, it becomes desirable to communicate with one of the local telephones, or to arrange to transfer a call from the outside to another local telephone, the originating party may depress his switch hook momentarily releasing the call. As the selector brush C of the selector SEL leaves the terminal 10 the relay 100 releases, thus opening the 115-volt 60-cycle alternating current to the rectifier 112. Condenser 113 is fully charged and will maintain the relay 114 in operating condition for approximately six seconds. With the relay 100 down and the relay 114 operated, the trunk line as shown in Fig. 9 is held through the left middle normally closed contacts 99 of the relay 100, the left make contacts of the relay 114 to the other side of the trunk circuit. After releasing the local call, the originator lifts the reset transmitter or releases his switch hook, thereby originating another call and receiving the dial tone. The relay 114 which has remained operated is again energized through the locking path over its right-hand contacts and power is supplied to the rectifier 112 as soon as a local call is established.

During the course of such a local call, the relay 114 remains locked, holding the outside call. If it is desired to transfer the call to another local dial telephone, that party is called and instructed to dial zero (10) on the dial calling device. This accomplished, the relay 100 again operates removing the resistance short from the trunk and connecting the talking circuit through the calling party. When the calling party disconnects the trunk circuit will be held approximately six seconds until the relay 114 releases.

As will be understood, incoming calls on the outside line at the trunk connection may be answered from any one of the ten dial-telephone stations (L1–L10) by simply dialing zero (10) at any one thereof.

Any one of the ten dial-telephone stations (L1–L10) may utilize the facilities of a speaker system, recorder or radio transmitting device, when such device is connected to the trunk terminals indicated in Fig. 9. The operation of relay 100 introduces the 24-volt direct-current voltage from the relay right outer contacts on a pair of terminals marked CTL in Fig. 2. These terminals are connected to a relay in the associated device which operates and applies power to the device or otherwise causes it to be made operative.

During the use of the trunk circuit shown in Fig. 9, the dial telephone connected to line circuit L10 may originate a call, but cannot be called.

In the above description all reference has been to the ten dial-telephone exchange unit 1 of Figs. 1 and 2, but additional line circuits and telephones may, of course, be added by increasing the number of terminals and contact arrangements on the line-finder and selector switches LF and SEL, respectively.

The following table gives reasonable values (or commercial identity) for the several electrical components identified by the reference numerals of the drawings.

Transformers:
- 18=117 volt primary, 25.2 volt secondary output
- 80=117 volt primary step down ratio 2.5 to 1

Filter choke:
- 24=0.8H at 375 ma., 25 ohm resistance
- Relays=Potter & Brumfied MH–17D Stepper switches (line-finder, selector):
- L–F=2 magnet, 3 tiers, 10 position
- SEL=2 magnet, 3 tiers, 10 position, both Clare A33324

Rectifiers:
- 20=600 ma.
- 38=250 ma.
- 85=75 ma.
- 112=75 ma.
- LX (1–10)=65 ma.

Condensers:
- 21=500 mfd., 50 v.
- 22=500 mfd., 50 v.
- 23=500 mfd., 50 v.
- 113=500 mfd., 50 v.
- 39=3×40 mfd., 150 v.
- 50=100 mfd., 50 v.
- 95=20 mfd., 150 v.
- 93=2 mfd., 200 v.
- 75=0.01 mfd., 200 v.
- 90=0.01 mfd., 200 v.
- 104=0.01 mfd., 200 v.
- 103=0.01 mfd., 200 v.
- 78=100 mfd., 50 v.

Resistors:
- 45=2000 ohm, 10 w., wire wound
- 52=125 ohm, 10 w., wire wound
- 66=2000 ohm, 10 w., wire wound
- 116=2000 ohm, 10 w., wire wound
- 97=2000 ohm, 10 w., wire wound
- 111=2000 ohm, 10 w., wire wound
- LR (1–10)=430 ohm, 1 w., carbon
- 117=300 ohm, 10 w., wire wound
- 118=300 ohm, 10 w., wire wound It will be understood that this disclosure is merely typical of applicant's invention and that its use is not limited to the particular embodiments illustrated and described, nor is it limited to automatic telephone systems since it may be employed to advantage in automatic selective switching arrangements. And it will also be understood that many changes, modifications and deviations may be employed within the scope of the appended claims.

I claim:

1. In an automatic private exchange dial telephone system the combination of a line-finder switch and actuating circuits therefor, a selector switch and actuating circuits therefor, a plurality of relays and operating circuits associated with said line-finder and selector switches, common-voltage and return connections for said operating circuits adapted to be provided with relatively high-voltage current, a plurality of dial telephones each including a receiver-transmitter, a switch adapted to be operated upon lifting said receiver-transmitter, a dial actuated calling device, and an incoming call indicating device, a plurality of single pair conductors connected to said dial telephones, one pair to each telephone, adapted to provide a plurality of line circuits, one for each telephone, a common supply circuit adapted to be provided with relatively low-voltage direct current, each of said line circuits being connected across said common supply circuit, each of said switches at said telephones adapted to connect the telephone in its line circuit to provide a path for current flow from said common supply circuit through said line circuit upon lifting the telephone's receiver-transmitter, a plurality of electrical elements one in each of said line circuits adapted to establish a potential drop thereacross when current from said common supply circuit flows therethrough, a start relay in said common supply circuit adapted to start said line-finder switch, a stop relay actuated by the potential drop across any one of said line circuit electrical elements adapted to stop said line-finder switch, a plurality of half-wave rectifiers, one connected in each of said line circuits adapted to polarize the line circuit and to permit the flow of current therein in the said common supply circuit direct current direction only, means including said line-finder and selector switches for selectively establishing a circuit between a calling and called dial telephone including the common supply circuit upon first lifting the receiver-transmitter at the calling telephone and then operating the dial device thereat, means for actuating the incoming call indicating device of the said called telephone including a signaling voltage generator, means for impressing the signaling voltage across the said indicating device and separated from the said common supply circuit by the half-wave rectifier in the said called telephone line circuit, and means for polarizing said signaling voltage so that the signaling voltage current is prevented from flowing into said other line circuits by the half-wave rectifier in the said called telephone line circuit, whereby selective intercommunication may be had between said dial telephones without the use of line relay equipment, means for applying a voltage to the half-wave rectifiers in the line circuits of the said calling and called telephones to prevent current flow therethrough, and busy signaling means including actuating means, said actuating means being connected in the common supply circuit, whereby said busy signaling means remains unactuated until the operation of a switch by the lifting of the receiver-transmitter of one of said dial telephones other than the calling or called telephone.

2. In an automatic private exchange dial telephone system the combination of a line-finder switch and actuating circuits therefor, a selector switch and actuating circuits therefor, a plurality of relays and operating circuits associated with said line-finder and selector switches, common-voltage and return connections for said operating circuits adapted to be provided with relatively high-voltage current, a plurality of dial telephones each including a receiver-transmitter, a switch adapted to be operated upon lifting said receiver-transmitter, a dial actuated calling device, and an incoming call indicating device, a plurality of single pair conductors connected to said dial telephones, one pair to each telephone, adapted to provide a plurality of line circuits, one for each telephone, a common supply circuit adapted to be provided with relatively low-voltage direct current, each of said line circuits being connected across said common supply circuit, each of said switches at said telephones adapted to connect the telephone in its line circuit to provide a path for current flow from said common supply circuit through said line circuit upon lifting the telephone's receiver-transmitter, a plurality of electrical elements one in each of said line circuits adapted to establish a potential drop thereacross when current from said common supply circuit flows therethrough, a start relay in said common supply circuit adapted to start said line-finder switch, a stop relay actuated by the potential drop across any one of said line circuit electrical elements adapted to stop said line-finder switch, a plurality of half-wave rectifiers, one connected in each of said line circuits adapted to polarize the line circuit and to permit the flow of current therein in the said common supply circuit direct current direction only, means including said line-finder and selector switches for selectively establishing a circuit between a calling and called dial telephone including the common supply circuit upon first lifting the receiver-transmitter at the calling telephone and then operating the dial device thereat, means for actuating the incoming call indicating device of the said called telephone including a signaling voltage generator, means for impressing the signaling voltage across the said indicating device and separated from the said common supply circuit by the half-wave rectifier in the said called telephone line circuit, and means for polarizing said signaling voltage so that the signaling voltage current is prevented from flowing into said other line circuits by the half-wave rectifier in the said called telephone line circuit, whereby selective intercommunication may be had between said dial telephones without the use of line relay equipment.

3. An automatic private exchange telephone system comprising a common supply circuit, a plurality of telephone line circuits connected across said common supply circut, a plurality of polarizing elements one connected in each of said line circuits to permit current flow therein in one direction only, that direction being the same for all of said line circuits, a plurality of telephones one associated with each of said line circuits, a plurality of switches one associated with each of said telephones, each switch being adapted to connect the telephone to its line circuit and to provide a path for current flow from said common supply circuit through said line circuit, a plurality of electrical elements one in each of said line circuits, each element being adapted to establish a potential drop thereacross when current from said common supply circuit flows therethrough, means for selectively establishing a circuit between a calling and called telephone including a calling telephone line-finder switch, an actuating device for said line-finder switch connected in said common supply circuit, a control device for said line-finder switch sensitive to the potential drop across said electrical elements, and means for connecting the called telephone to the said line-finder switch, a plurality of incoming call indicating devices one associated with each telephone, means for actuating the incoming call indicating device of the called telephone including a signaling voltage generator, means for impressing the signaling voltage across the said indicating device and separated from the said common supply circuit by the polarizing element in the said called telephone line circuit, and means for polarizing said signaling voltage so that the signaling voltage current is prevented from flowing into said other line circuits by the said polarizing element in the said called telephone line circuit, whereby selective intercommunication may be had between said telephones without the use of line relay equipment.

4. An automatic private exchange telephone system comprising a common supply circuit, a plurality of telephone line circuits connected across said common supply circuit, each of said line circuits being polarized, a plurality of telephones one associated with each of said telephone line circuits, a plurality of incoming call indicating devices one associated with each telephone, means for interconnecting a calling and called telephone from among said plurality of telephones including a line-finder, an actuating device for said line-finder, said actuating device being connected in said common supply circuit, a control device adapted to connect said line-finder to said calling telephone line circuit, and means for connecting a selected called telephone to said line-finder, and means for actuating the incoming call indicating device of the called telephone including a signaling voltage generator, means for polarizing said signaling voltage, means for impressing said polarized signaling voltage on the called telephone line circuit, whereby the signaling voltage current is prevented from flowing into said other line circuits by said signaling voltage and line circuit polarization and selective intercommunication may be had between said calling and called telephone without the use of line relay equipment.

5. In an automatic private exchange telephone system the combination of a common supply circuit, a plurality of telephone line circuits connected across said common supply circuit, a plurality of telephones one associated with each of said line circuits, a plurality of switches one associated with each of said telephones, each switch being adapted to connect the telephone to its line circuit and to provide a path for current flow from said common supply circuit through said line circuit, a plurality of electrical elements one in each of said line circuits, each element being adapted to establish a potential drop thereacross when current from said common supply circuit flows therethrough, means for selectively establishing a circuit between a calling and called telephone including a calling telephone line-finder switch, an actuating device for said line-finder switch connected in said common supply circuit, a control device for said line-finder switch sensitive to the potential drop across said electrical elements, and means for connecting the called telephone to the said line-finder switch, whereby selective connection between said calling and called telephones may be made without the use of line relays.

6. An automatic switching exchange comprising the combination of a line-finder switch having a plurality of contact terminals and a contactor movable thereover, actuating circuits for said line-finder contactor, a selector switch having a plurality of contact terminals and a contactor movable thereover, actuating circuits for said selector contactor, a common supply circuit, a plurality of line circuits connected to said common supply circuit adapted to be interconnected by said line-finder and selector switches, a plurality of switches one in each line circuit, each switch being adapted to provide a current path from said common supply circuit through said line circuit, a plurality of electrical elements one in each of said line circuits, each element being adapted to establish a potential drop thereacross when current from said common supply circuit flows therethrough, an actuating device associated with said line-finder switch, said actuating device being connected in said common supply circuit, a device to control the movement of said contactors over said terminals of said line-finder switch sensitive to the potential drop across said electrical elements, a device for actuating and controlling the movement of said contactors over said terminals of said selector switch, whereby the selective connection of one of said line circuits with any other of said line circuits may be made without the use of line relays.

7. A private exchange telephone system comprising a common supply circuit, a plurality of telephone line circuits connected across said common supply circuit, a plurality of polarizing elements one connected in each of said line circuits to permit current flow therein in one direction only, a plurality of telephones adapted to be connected one to each of said telephone line circuits, a plurality of incoming call indicating devices one associated with each of said telephones, means for actuating the incoming call indicating device of one of said telephones including a signaling voltage generator, means for impressing the signaling voltage across the said indicating device and separated from the said common supply circuit by the polarizing element in the telephone line circuit associated with said signaling device, and means for polarizing said signaling voltage so that the signaling voltage current is prevented from flowing into said other line circuits by the said polarizing element in the said telephone line circuit, whereby selective intercommunication may be had between said telephones without the use of line relay equipment.

8. In an automatic private exchange telephone system the combination of a common supply circuit, a plurality of telephone line circuits connected across said common supply circuit, each of said line circuits being polarized, a plurality of telephones one associated with each of said line circuits, a plurality of switches one associated with each of said telephones, each switch being adapted to connect the telephone to its line circuit and to provide a path for current flow from said common supply circuit through said line circuit, a plurality of electrical elements one in each of said line circuits, each element being adapted to establish a potential drop thereacross when current from said common supply circuit flows therethrough, means for selectively establishing a circuit between a calling and called telephone including a calling telephone line-finder switch, an actuating device for said line-finder switch connected in said common supply circuit, a control device for said line-finder switch sensitive to the potential drop across said electrical elements, and means for connecting the called telephone to the said line-finder switch, a plurality of incoming call indicating devices one associated with each telephone, means for actuating the incoming call indicating device of the called telephone including a signaling voltage generator, means for polarizing said signaling voltage, means for impressing said polarized signaling voltage on the called telephone line circuit, whereby the signaling voltage current is prevented from flowing into said other line circuits by said signaling voltage and line circuit polarization and selective intercommunication may be had between said calling and called telephones without the use of line relay equipment.

9. A private exchange telephone system comprising a common supply circuit, a plurality of telephone line circuits connected across said common supply circuit, a plurality of polarizing elements one connected in each of said line circuits to permit current flow therein in one direction only, a plurality of telephones adapted to be connected one to each of said telephone line circuits, a plurality of incoming call indicating devices one associated with each of said telephones, means for interconnecting a calling and called telephone from among said telephones to establish a talking circuit therebetween, means for actuating the incoming call indicating device of the called telephone including a signaling voltage generator, means for impressing the signaling voltage across the said indicating device and separated from the said common supply circuit by the polarizing element in the said called telephone line circuit, and means for polarizing said signaling voltage so that the signaling voltage current is prevented from flowing into said other line circuits by the polarizing element in the said called telephone line circuit, whereby selective intercommunication may be had between said telephones without the use of line relay equipment.

10. A private exchange telephone system comprising a common supply circuit, a plurality of telephone line circuits connected across said common supply circuit, a plurality of polarizing elements one connected in each of said line circuits to permit current flow therein in one direction only, a plurality of telephones one associated with each of said line circuits, a plurality of switches one associated with each of said telephones, each switch being adapted to connect the telephone to its line circuit and to provide a path for current flow from said common supply circuit through said line circuit, means for interconnecting a calling and called telephone from among said telephones to establish a talking circuit therebetween, means for applying a voltage to the polarizing elements in the line circuits of the calling and called telephones to prevent current flow from said common supply circuit therethrough, busy signaling means including actuating means, said actuating means being connected in the common supply circuit, whereby said busy signaling means remains unactuated until the operation of a switch associated with one of the plurality of telephones other than the calling or called telephone.

References Cited in the file of this patent

UNITED STATES PATENTS

| | | |
|---|---|---|
| 1,841,084 | Bragg | Jan. 12, 1932 |
| 2,001,095 | Deakin | May 15, 1935 |
| 2,152,889 | Jedrychowski | Apr. 4, 1939 |
| 2,186,242 | Halligan | Jan. 9, 1940 |
| 2,281,508 | Lundstrom | Apr. 28, 1942 |